(No Model.) 2 Sheets—Sheet 1.

G. B. PENNOCK.
UNDERGROUND CONDUIT FOR POWERFUL ELECTRIC CURRENTS.

No. 359,738. Patented Mar. 22, 1887.

WITNESSES: Gabriel J. W. Galesley, William O. Miles.

INVENTOR George B. Pennock, BY J. B. Sabine, ATTORNEY.

(No Model.) 2 Sheets—Sheet 2.

G. B. PENNOCK.
UNDERGROUND CONDUIT FOR POWERFUL ELECTRIC CURRENTS.

No. 359,738. Patented Mar. 22, 1887.

WITNESSES:
Gabriel J. W. Galster
William O. Miles

INVENTOR
George B. Pennock
BY
J. B. Sabine
ATTORNEY

UNITED STATES PATENT OFFICE.

GEORGE B. PENNOCK, OF BROOKLYN, NEW YORK.

UNDERGROUND CONDUIT FOR POWERFUL ELECTRIC CURRENTS.

SPECIFICATION forming part of Letters Patent No. 359,738, dated March 22, 1887.

Application filed April 21, 1886. Serial No. 199,708. (No model.)

*To all whom it may concern:*

Be it known that I, GEORGE B. PENNOCK, a citizen of the United States, and a resident of Brooklyn, in the county of Kings and State of New York, have invented certain new and useful Improvements in Underground Conduits for Powerful Electric Currents, of which the following is a specification.

My invention relates to improvements in underground conduits; and the object of my improvements is to provide a conduit that will convey in condition for work powerful electric currents without injury to the conduit or surroundings. I attain this object by means of the structure illustrated in the accompanying drawings, in which—

Figure 1:
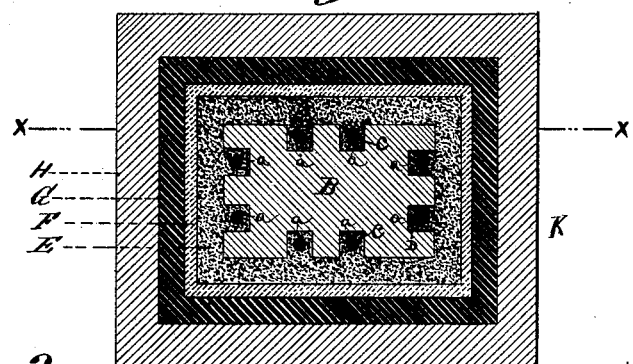
Figure 2:
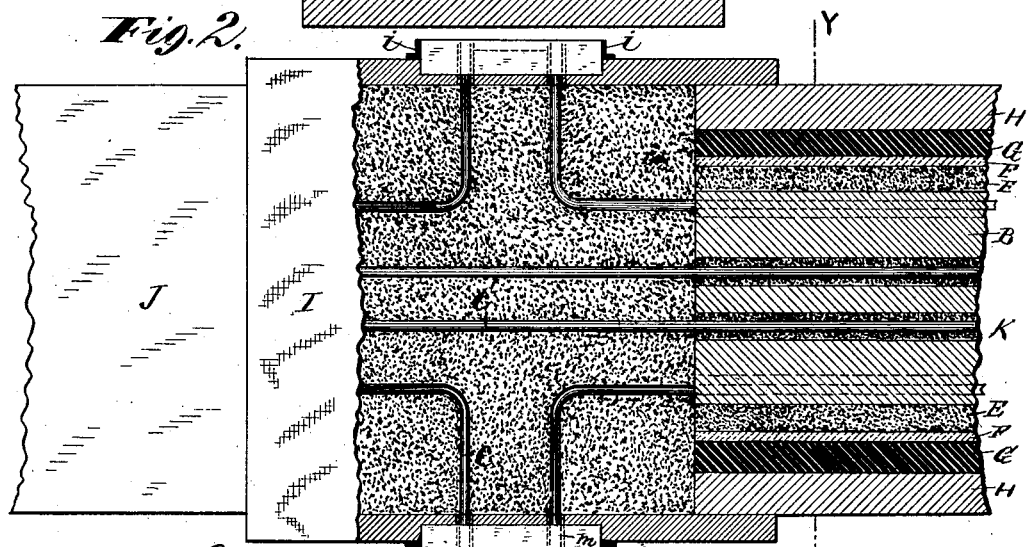
Figure 3:
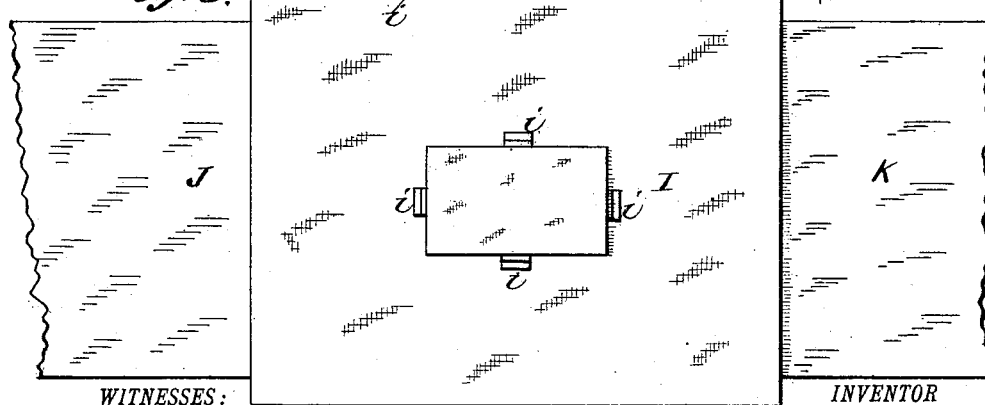
Figure 4:
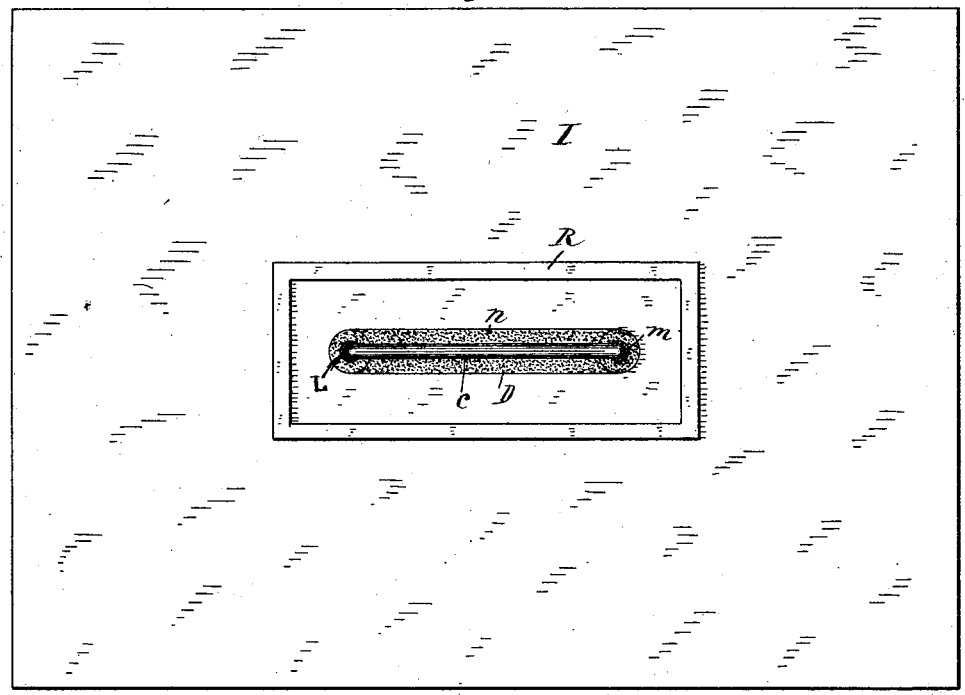
Figure 5:
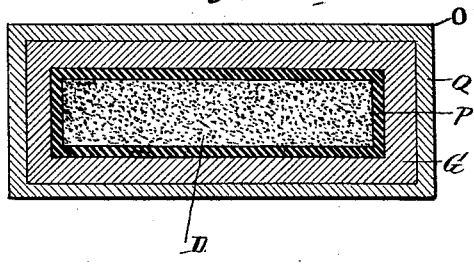

Figure 1 is an end view of a section of my improved electric-current underground conduit; Fig. 2, a top view of the same; Fig. 3, a lateral view of two sections of the same placed in line and united by a sleeve; Fig. 4, a side view of the sleeve with its water-proof cap removed; Fig. 5, an end view of the water-proof cap.

Similar letters refer to similar parts throughout the several views.

It is necessary in order to construct a perfect and durable underground conduit for electric-light wires and electro-motive powers, that the entire structure should be one solid impermeable mass. No hollow box or tubing will answer. Not a drop of moisture should penetrate the exterior covering, and the compounds used should be decay-proof, water-proof, and heat-proof. No insulation should be used that will corrode the conductors. The insulating material should be loose and porous, while the conductors should be well separated. This cannot be accomplished by using cables. The wires must be placed in their cells and lanes permanent and solid. They must be subjected to no strain. The sections of the conduit should be entirely finished before leaving the factory. Man-holes, hollow boxes, and tubing should be avoided, for sooner or later they become sewers and water-conveyers, and as soon as underground electric-light wires are dampened the powerful currents in use on these circuits fail to act, as the faintest leak will cause the current to burn to the iron tubing and to the ground.

Hollow structures are also a source of danger, as they readily fill with gas, which is caused to ignite by the sparking of the bare wires in the man-holes, causing explosions, hurling the man-hole covers high in the air; and a case is known where the entire conduit for blocks was filled with a flaming fire, which melted the insulation, immediately grounding every circuit. The object of my invention is to produce for electric-light wires and for electro-motive power a solid underground conduit, so constructed, first, that the insulated electric-current wires shall be completely guarded against moisture; second, that the wires be widely separated from each other by fire-proof and heat-proof insulations; and third, that the wires shall have a capacity to be readily tapped for lateral branches without removing the waterproof compound forming the main conduit.

The sections of the conduit are made in any convenient length and completely finished at the factory—that is to say, the electric-current conductors are adjusted in their several cells, which are formed in the outer surface of a solid block of fireproofed wood and surrounded and packed tightly in mineral wool. The block is inclosed in a fireproofed wooden box of light material, or of boards composed of fireproofed paper, straw, or wood pulp, the block being enveloped in a thick packing of mineral wool. The inside conduit, now thoroughly insulated, is inclosed in a wooden case and enveloped with any good water-proof compound constituting a solid insulated impermeable mass. The sections thus made are laid in line in trenches a short distance apart and united by sleeves, within which the corresponding wires of neighboring sections are connected. Individual wires are caused to form loops for lateral connections by being pushed and conveyed through apertures in opposite sides of the sleeves and caused to occupy deep grooves cut, for this purpose, in the exterior of the sides of the sleeves. The looped wires C, apertures *m*, and grooves *n* are covered with moisture-proof caps or boxes. When it is desired to attach lateral conduits, the water-proof caps or boxes are removed.

Referring now to Fig. 1, A represents cells to receive the electric wires; B, a solid block of fireproofed wood; C, the electric-light wires and electro-motive-power wires; D, a packing of mineral wool, which acts as an absolute heat-proof insulation; E, thick packing of mineral wool; F, an inside conduit of fireproofed wood, or of boards composed of fireproofed paper, straw, or wood pulp rendered fire-proof by a thorough soaking in soluble glass; G, a solid mass of waterproofing; H, a wooden case.

In Figs. 2 and 3 I represents a sleeve for uniting two sections—such as J and K—of the conduit. The sleeve I consists of a box of waterproofed wood, which closely overlaps the ends of sections J and K, and is screwed to them.

In Fig. 4, L represents glass tubing; $m$, apertures in the opposite sides of sleeves; $n$, grooves inside of sleeve; and in Fig. 5 O represents water-proof caps or boxes which cover the apertures $m$ and grooves $n$. (Shown in Fig. 4.) These boxes consist each of an inner box, P, an outer box, Q, of waterproofed wood, with the intervening space, G, filled with any good water-proof compound, the inner box, P, being filled with mineral wool resting on the grooves. The boxes when in position fit into rabbets or grooves R, Fig. 4, formed over the wire-grooves, and are securely fastened to the main conduit by iron knees or brackets $i$, Figs. 2 and 3.

After the connection of the wires in the sleeves, the spaces therein between the wires are packed with mineral wool, and the space between the wires and the walls of the sleeve is filled with any good moisture-resisting compound, the wires being protected with a jacket of mineral wool.

I claim—

1. For electric-light wires and electro-motive-power conductors, an underground conduit constructed in sections, each consisting of a solid impermeable insulated heat-proof mass, in which the wires are adjusted in longitudinal cells formed in solid blocks of fireproofed wood and packed in with mineral wool, which is inclosed in fire-proof and water-proof insulating materials, the whole contained in a board case, substantially as set forth.

2. In a moisture-proof underground conduit for electric-light wires and electro-motive-power conductors, the combination of any section J and its neighboring section K with a wooden sleeve, I, which is provided with one or more side apertures, $m$, glass tubing L, one or more grooves, $n$, into which the wires of the main conduit are looped and packed with mineral wool, covered with the removable moisture-proof caps O, for the purpose of facilitating the attachment of lateral electric-light conduits without disturbing the solidity of the main conduit.

3. For an electric-light underground and electro-motive-power conductor, a conduit constructed in sections, each consisting of a solid block of fireproofed wood, B, with longitudinal cells A, bare wires C, mineral-wool insulation D, mineral-wool packing E, and fire-proof inner conduit, F, the whole inclosed in water-proof insulating materials, all contained in a casing, substantially as set forth, for the purpose of carrying and distributing powerful electric currents for lighting the streets or dwellings and for furnishing electro-motive power from central stations.

Signed at New York, in the county of New York and State of New York, this 19th day of April, A. D. 1886.

GEORGE B. PENNOCK.

Witnesses:
    J. B. SABINE,
    WM. O. MILES.